United States Patent
Wong (10) Patent No.: US 8,352,612 B2
(45) Date of Patent: Jan. 8, 2013

(54) DEVICE-SERVICE AFFILIATION VIA INTERNET VIDEO LINK (IVL)

(75) Inventor: Ling Jun Wong, Escondido, CA (US)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 12/901,626

(22) Filed: Oct. 11, 2010

(65) Prior Publication Data

US 2011/0119341 A1    May 19, 2011

Related U.S. Application Data (60) Provisional application No. 61/262,098, filed on Nov. 17, 2009.

(51) Int. Cl.
  *G06F 15/16*   (2006.01)
  *G06F 15/173*  (2006.01)
  *G06F 15/177*  (2006.01)

(52) U.S. Cl. ........ 709/226; 709/203; 709/206; 709/217; 709/224

(58) Field of Classification Search .................. 709/203, 709/206, 224; 725/51, 109, 152
See application file for complete search history.

(56) References Cited

U.S. PATENT DOCUMENTS

| | | | |
|---|---|---|---|
| 8,056,113 B2* | 11/2011 | Balasubramanian et al. | 725/152 |
| 8,225,362 B2* | 7/2012 | Mehta | 709/224 |
| 2003/0018979 A1 | 1/2003 | Hasegawa et al. | |
| 2007/0198738 A1 | 8/2007 | Angiolillo et al. | |
| 2008/0127255 A1 | 5/2008 | Ress et al. | |
| 2008/0141305 A1 | 6/2008 | Zhao | |
| 2008/0235747 A1 | 9/2008 | Choi | |
| 2009/0063645 A1 | 3/2009 | Casey et al. | |
| 2009/0167839 A1 | 7/2009 | Ottmar | |
| 2009/0282447 A1* | 11/2009 | Mehta | 725/109 |
| 2010/0036907 A1* | 2/2010 | Douillet et al. | 709/203 |
| 2011/0088064 A1* | 4/2011 | Xiong | 725/51 |

FOREIGN PATENT DOCUMENTS

| | | |
|---|---|---|
| CN | 101394503 A | 3/2009 |
| EP | 1 691 556 A2 | 8/2006 |

OTHER PUBLICATIONS

Lawton, "TV+Social Network=?" Wall Street Journal Online, Oct. 27, 2008.
Abreu et al., "From Scratch to User Evaluation—Validating a Social iTV Platform," Paper presented at Workshop EuroITV2008; Jul. 2, 2008.
International Search Report and Written Opinion, PCT/US2010/056552; dated Jul. 25, 2011; Received Aug. 11, 2011.

* cited by examiner

*Primary Examiner* — Quang N. Nguyen
(74) *Attorney, Agent, or Firm* — Miller Patent Services; Jerry A. Miller (57) ABSTRACT

A registration request message for affiliation with a service provider using an Internet video link (IVL) communication feature hosted by an Internet video link (IVL) server is received from an IVL device by the IVL server, where the IVL communication feature utilizes an IVL communication module to provide a communication interface with the service provider. The IVL device is registered with the IVL communication feature. A registration response message is sent to the IVL device acknowledging the affiliation with the service provider using the IVL communication feature. IVL communication feature messages are processed between the registered IVL device and the service provider. This abstract is not to be considered limiting, since other embodiments may deviate from the features described in this abstract.

16 Claims, 6 Drawing Sheets

DEVICE-SERVICE AFFILIATION VIA INTERNET VIDEO LINK (IVL)

CROSS REFERENCE TO RELATED DOCUMENTS

This application claims priority to and claims the benefit of U.S. Provisional Patent Application Ser. No. 61/262,098 titled "USER-TO-USER COMMUNICATION SYSTEM AMONG BIVL-ENABLED SONY PRODUCTS," which was filed in the United States Patent and Trademark Office on Nov. 17, 2009, and which is incorporated herein by reference in its entirety.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the United States Patent and Trademark Office patent file or records, but otherwise reserves all copyright rights whatsoever. Trademarks are the property of their respective owners.

BACKGROUND

Text messaging allows users of cell phones to send messages to other cell phone users. Email allows users of computers or other email-capable devices to send emails to other email users. Instant messaging allows users of computers to send instant messages to other computer users. Each device that is capable of one of these forms of communication uses a platform for communication specific to these different communication types.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides automated device-service affiliation via Internet video link (IVL). The Internet video link may be provided by a device with an IVL interconnection within a network, such as a Sony Corporation Bravia® Internet Video Link (BIVL™) interconnection. The present subject matter provides an infrastructure for Internet-enabled devices to communicate with other Internet-enabled devices that are distinctly different. For example, conventional personal computers (PCs) may send a text message to another PC and a conventional cellular telephone may send a text message to another cell phone, but a conventional PlayStation® device (e.g., a PS 3C)) may not be able to send a text message to a television (TV).

The present subject matter bridges these platform differences and provides a feature-based IVL interface for inter-device communication. The IVL features described herein allow users of IVL-compliant products (e.g., Blue-ray™ disc players, PS 3®, Bravia® TV, BIVL™, and other compatible audio/video and gaming devices) to be able to communicate among one another on a single platform in terms of information sharing like text messaging, provided the users are using the IVL service on their IVL-compliant device. As such, the IVL features do not need to exist globally within a specific product to avoid platform constraints. In contrast, the IVL features exist as part of IVL services. By providing an IVL as a common feature among these devices, disparate devices may interact without requiring platform changes for the respective device. Accordingly, the communications described herein may be enabled and disabled, and may be active whenever a user is using the IVL service. For example, the IVL features may be inactive if a user is viewing a TV channel or playing a PS 3® game, but may be enabled/activated in response to a notification, alert, or message (collectively "messages") from an IVL server indicating that a message has been received.

Regarding user-interface aspects for the present subject matter, an IVL-compliant device may reserve a display area for messages delivered via the IVL feature(s). The IVL device(s) may poll the IVL server at various intervals (e.g., periodically, aperiodically, upon activation of the IVL feature on the IVL device, etc.) for updates or the IVL server may push messages to the IVL device(s) at various intervals.

To configure an IVL device for message processing via the IVL server, the user registers (e.g., affiliates) the IVL-compliant device with the IVL server and/or with other IVL-compliant devices. Upon completion of IVL feature registration, the IVL server may send a registration response message to the IVL device acknowledging affiliation with the service provider via the IVL communication feature and may begin processing IVL communication feature messages between the registered IVL device and the service provider. The IVL communication feature may be considered a platform-independent communication feature operable via activation of the IVL service on the respective IVL device rather than as a basic operational feature of the IVL device. As such, the IVL communication feature may include an IVL inter-platform communication feature, and IVL inter-platform communication feature messages may be processed during periods of activation of the IVL inter-platform communication feature at the IVL device.

A user may open a form within an IVL video guide to send a message to another IVL-compliant device (e.g., an IVL server or another IVL-compliant device). The user may type message content within the form along with selection or typing of a recipient identifier (ID) and select a "send" option. The message may be formatted as an extensible markup language (XML) message and may be sent to the hosting IVL server via the IVL protocol. Upon receipt of the message by the IVL server, the IVL server may place the message as a feature "update" in the recipient's IVL account. The receiving IVL-compliant device may poll for updates from the IVL server via the IVL protocol (or the server may perform a push operation to the IVL-compliant device). The recipient IVL device may then retrieve the message in the form of an extensible markup language (XML) message. The receiving IVL-compliant device may parse information within the XML message and display the text on the screen within the reserved display area for the IVL feature. The recipient may choose to reply to the message or ignore it. If the recipient replies to the message, processing as described above may continue. Otherwise, the display of the text content may automatically disappear from the reserved display area after a configured time (e.g., five seconds, ten seconds, etc.), though the received message may be retained within an "inbox" of the receiving IVL device for later viewing or archival purposes.

Accordingly, the IVL feature allows different devices of different base platforms to communicate with each other on a common feature of an Internet Video link.

The automated device-service affiliation via Internet video link (IVL) described herein also provides IVL device affiliation with service providers via one or more IVL feature(s). The service providers may include IVL-based device manufacturers, audio and/or video or audio/video content providers, vendors for products and services, or any other form of service provider. By affiliating an IVL device with a service provider, the user may directly communicate with the respective service provider(s) via the respective IVL feature(s) to ask questions, inquire about and receive promotional offers, and interact with customer support individuals or other individuals via a mail box/inbox feature for IVL message communication.

For example, where the service provider is an IVL device manufacturer, by providing device-service affiliation, device users no longer have to wade through lengthy detailed frequently asked question (FAQ) web pages to potentially find an answer to a question about an operational feature of their IVL device. The user may initiate an IVL device feature inquiry to an IVL server including a question about an operational feature of the IVL device. The user's questions may be processed by the IVL server to identify an affiliated service provider associated with the inquiry. The IVL server may identify a repository storage location that stores information associated with the operational feature of the IVL device as a solution source and a link to the solution source may be sent to the IVL device including a link to the repository storage location. Alternatively, the IVL server may determine that a service provider consumer support agent associated with the service provider provides the solution source. The IVL server may forward the IVL device feature inquiry message associated with an operational feature of the IVL device to a service provider consumer support agent IVL device associated with the service provider consumer support agent, and may send a link to the service provider consumer support agent IVL device associated with the service provider consumer support agent to the IVL device. The IVL server may further instruct the IVL device to open a dialog box at the IVL device associated with the IVL communication feature for communication between the registered IVL device and the service provider consumer support agent.

Additionally, if a feature upgrade is available for the IVL device, the IVL server may determine that the feature upgrade associated with the IVL device is available from the service provider, and send a notification message to the IVL device including a link to the feature upgrade. As such, feature enhancements may be automated and messages announcing the feature enhancement(s) may be routed directly to the IVL device from the service provider via the IVL server.

Where the service provider includes an audio content provider, a video content provider, or an audio/video content provider, the IVL server may be configured to receive a notification of available content for sharing or purchase from the respective service provider on behalf of the affiliated IVL device. For purposes of the present description, "content" may include audio content, video content, still image content, audio/video content, or any other form of content as appropriate for a given implementation. The IVL server may forward the notification of available content for sharing to the IVL device. In response to receipt of the notification, the user may initiate a request via the IVL device for an item of the available content. The IVL server may obtain the requested item of content from the one of the audio, video, or audio/video content providers, and forward the requested item of content to the IVL device.

Similar processing may be performed by the IVL server for sharing of content between affiliated registered users of the respective IVL feature. As such, friends may register for an IVL content sharing feature and interact to share content via their respective IVL-compliant devices. In such an implementation, users may share content from an IVL video guide. Further, one or more start and end points may be specified by a user as part of content sharing to identify one or more ranges of content to be shared. In such an implementation, video (or audio, or audio/video) clips or content segments/fragments may be identified and shared without requiring all of a given content item to be shared. As such, bandwidth and user time may be conserved by sharing only portions of content that a sharing user believes may be of particular interest to the affiliated receiving user, thereby improving efficiency of content sharing for users, the IVL server, and the IVL devices. Many other possibilities exist for IVL feature affiliation between users and service providers and all are considered within the scope of the present subject matter.

As described above, the IVL server may instruct the IVL device to reserve a display area of a display associated with the IVL device for IVL communication feature notifications and may provide an "inbox" associated with the IVL server for each registered IVL device. Available IVL communication feature messages for the IVL device may be placed within the respective inboxes. The available IVL communication feature messages within the inbox may be sent to the IVL device for display via the reserved IVL device display area in response to the IVL device logging into the IVL server and polling for IVL communication feature messages, or in response to an IVL server push process to deliver the messages to the IVL device during a scheduled or unscheduled IVL communication event. Many other variations on processing of IVL service messages are possible and all are considered within the scope of the present subject matter.

Figure 1:
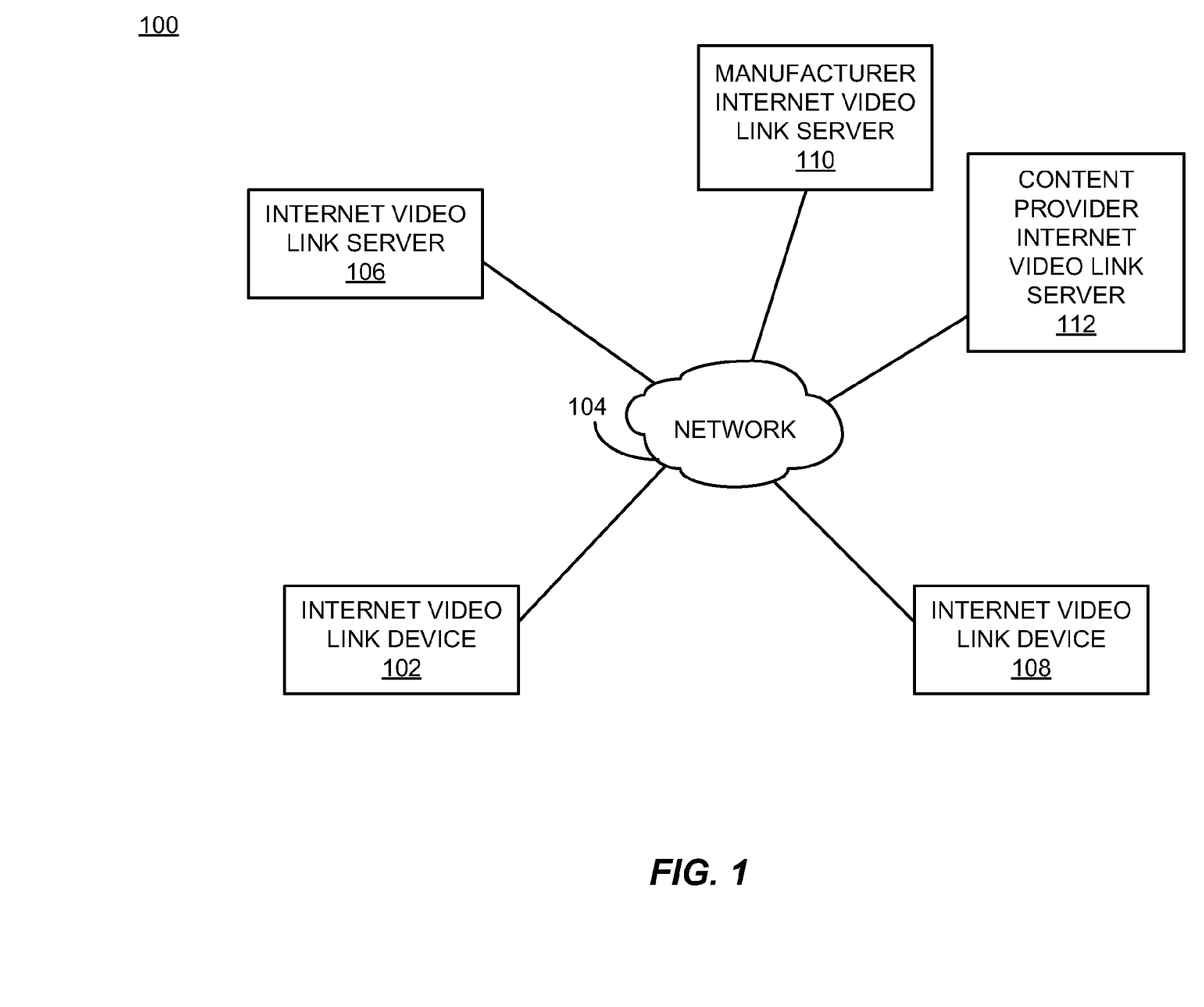
FIG. 1 is a block diagram of an example of an implementation of a system that provides automated device-service affiliation via Internet video link consistent with certain embodiments of the present invention.

Turning now to FIG. 1, FIG. 1 is a block diagram of an example of an implementation of a system 100 that provides automated device-service affiliation via Internet video link. An Internet video link (IVL) device 102 interconnects via a network 104 with an Internet video link (IVL) server 106. As will be described in more detail below, the IVL device 102 may access shared content and information and may provide shared content and information via the IVL server 106. The IVL server 106 provides automated processing of registration (e.g., affiliation) messages and other messages, as described above and in more detail below. An IVL device 108 represents at least one other IVL device for content sharing within the system 100. A manufacturer IVL server 110 and a content provider IVL server 112 each represent one or more servers that provide access to one or more manufacturers, such as a manufacturer of the IVL device 102, or content providers, such as audio, video, or audio/video content providers, respectively.

The IVL server 106 establishes account authorization and other provisioning to allow access by the IVL device 102 (and the other devices of the system 100) to interact and share messages via one or more IVL communication features hosted by the IVL server 106.

The network 104 may include one or more separate networks and may include any form of interconnection suitable for the intended purpose, including a private or public network such as an intranet or the Internet, respectively, direct inter-module interconnection, dial-up, wireless, or any other interconnection mechanism capable of allowing communication between respective devices. An example of a web-based protocol suitable for providing communication over the network 110 is the transmission control protocol over Internet protocol (TCP/IP). Markup language formatting, such as the hypertext transfer protocol (HTTP) and extensible markup language (XML) formatting, may be used for messaging over the TCP/IP connection with devices accessible via the network 104. Other web protocols exist and all are considered within the scope of the present subject matter. The IVL server 106 provides Internet video links for communication between the respective devices.

Figure 2:
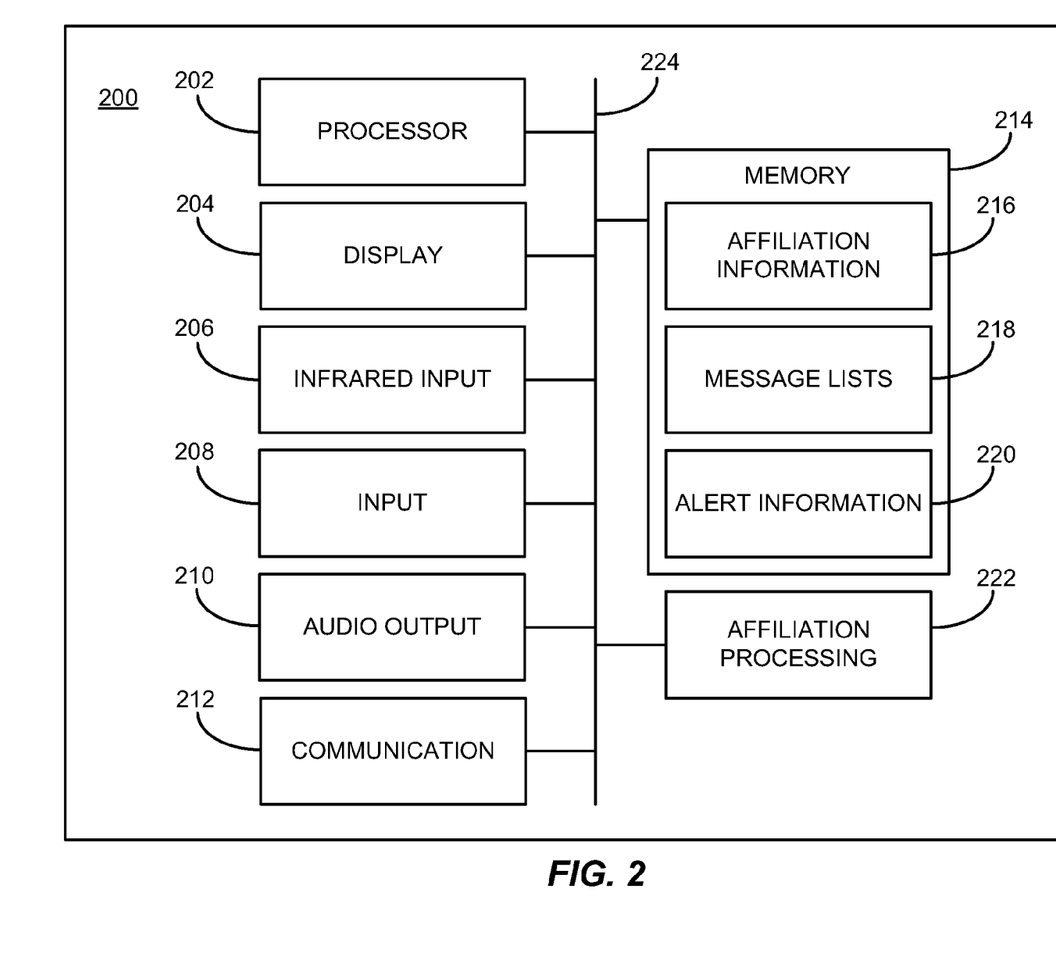
FIG. 2 is a block diagram of an example of an implementation of a core processing module that provides automated device-service affiliation via Internet video link consistent with certain embodiments of the present invention.

FIG. 2 is a block diagram of an example of an implementation of a core processing module 200 that provides automated device-service affiliation via Internet video link. The core processing module 200 represents a general module that may form a portion of any of the IVL device 102, the IVL server 106, the IVL device 108, the manufacturer IVL server 110, or the content provider IVL server 112, with potential modifications as appropriate for a given implementation. The particular functionality of the core processing module 200 may differ based upon which device the core processing module 200 is associated with. For example, while certain of the examples below detail processing of the IVL server 106, it is understood that complementary processing may be performed on the other devices, such as the IVL device 102, the IVL device 108, the manufacturer IVL server 110, and the content provider IVL server 112, in response to the processing described for the IVL server 106. As such, it is understood that all such processing is considered within the scope of the present subject matter. It is further understood that certain of the example modules described below may be considered optional as appropriate for a given implementation of the core processing module 200.

A processor 202 provides computer instruction execution, computation, and other capabilities within the core processing module 200. A display device 204 provides visual and/or other information to a user of the core processing module 200. The display device 204 may include any type of display device, such as a cathode ray tube (CRT), liquid crystal display (LCD), light emitting diode (LED), projection or other display element or panel. An infrared input device 206 provides input capabilities for the user of the display device 204 via a device, such as an infrared remote control device (not shown). An input device 208 provides input capabilities for the user. The input device 208 may include a keyboard, mouse, pen, trackball, or other input device. One or more input devices, such as the input device 208, may be used.

An audio output device 210 provides audio output capabilities for the core processing module 200, such as for example when the core processing module 200 forms a portion of a television or mobile device. The audio output device 210 may include a speaker, driver circuitry, and interface circuitry as appropriate for a given implementation.

A communication module 212 provides communication capabilities for interaction with the core processing module 200, such as for retrieval of audio and/or video content via a satellite, cable, the Internet, or other content provider such as the IVL device 108, the manufacturer IVL server 110, and the content provider IVL server 112, and other activities as appropriate for a given implementation. The communication module 212 may support wired or wireless standards appropriate for a given implementation. Example wired standards include Internet video link (IVL) interconnection within a home network, for example such as Sony Corporation's Bravia® Internet Video Link (BIVL™). Example wireless standards include cellular wireless communication and Bluetooth® wireless communication standards. Many other wired and wireless communication standards are possible and all are considered within the scope of the present subject matter.

A memory 214 includes an affiliation information storage area 216, a message lists storage area 218, and an alert information storage area 220. The affiliation information storage area 216 stores information associated with registered affiliations between IVL devices, including IVL device addresses, IVL device activity states (e.g., active, logged in, etc.). The message lists storage area 218 stores messages lists for each registered and affiliated IVL feature. One or more IVL features (e.g., affiliations) may be associated with each IVL device. As described above, IVL messages may be either polled by an IVL device upon activating the respective IVL feature associated with a given message list or may be pushed to the respective IVL device by the IVL server 106. The alert information storage area 220 stores generated alerts and state information for outstanding alerts to or from IVL devices (as appropriate for a given implementation) in response to generation of alerts when IVL messages are received.

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, an operating system storage area, a code execution area, and a data area without departure from the scope of the present subject matter.

An affiliation processing module 222 is also illustrated. The affiliation processing module 222 provides processing for registration of one or more IVL features for IVL devices, as described above and in more detail below. The affiliation processing module 222 implements the automated device-service affiliation via Internet video link of the core processing module 200.

Though the affiliation processing module 222 and other modules are illustrated as a component-level modules for ease of illustration and description purposes, it should be noted that the respective modules may include any hardware, programmed processor(s), and memory used to carry out the functions of this module as described above and in more detail below. For example, the respective modules may include additional controller circuitry in the form of application specific integrated circuits (ASICs), processors, and/or discrete integrated circuits and components for performing communication and electrical control activities associated with the respective devices. Additionally, respective modules may also include interrupt-level, stack-level, and application-level modules as appropriate. Furthermore, the respective modules may include any memory components used for storage, execution, and data processing for performing processing activities associated with the module.

It should also be noted that the affiliation processing module 222 may form a portion of other circuitry described without departure from the scope of the present subject matter. Further, the affiliation processing module 222 may alternatively be implemented as an application stored within the memory 214. In such an implementation, the affiliation processing module 222 may include instructions executed by the processor 202 for performing the functionality described herein. The processor 202 may execute these instructions to provide the processing capabilities described above and in more detail below for the core processing module 200. The affiliation processing module 222 may form a portion of an interrupt service routine (ISR), a portion of an operating system, a portion of a browser application, or a portion of a separate application without departure from the scope of the present subject matter.

The processor 202, the display device 204, the infrared input device 206, the input device 208, the audio output device 210, the communication module 212, the memory 214, and the affiliation processing module 222 are interconnected via one or more interconnections shown as interconnection 224 for ease of illustration. The interconnection 224 may include a system bus, a network, or any other interconnection capable of providing the respective components with suitable interconnection for the respective purpose. Those skilled in the art will appreciate upon consideration of the present teachings that the exact arrangement of the various modules can be varied without departing from implementations consistent with embodiments of the present invention.

Figure 3:
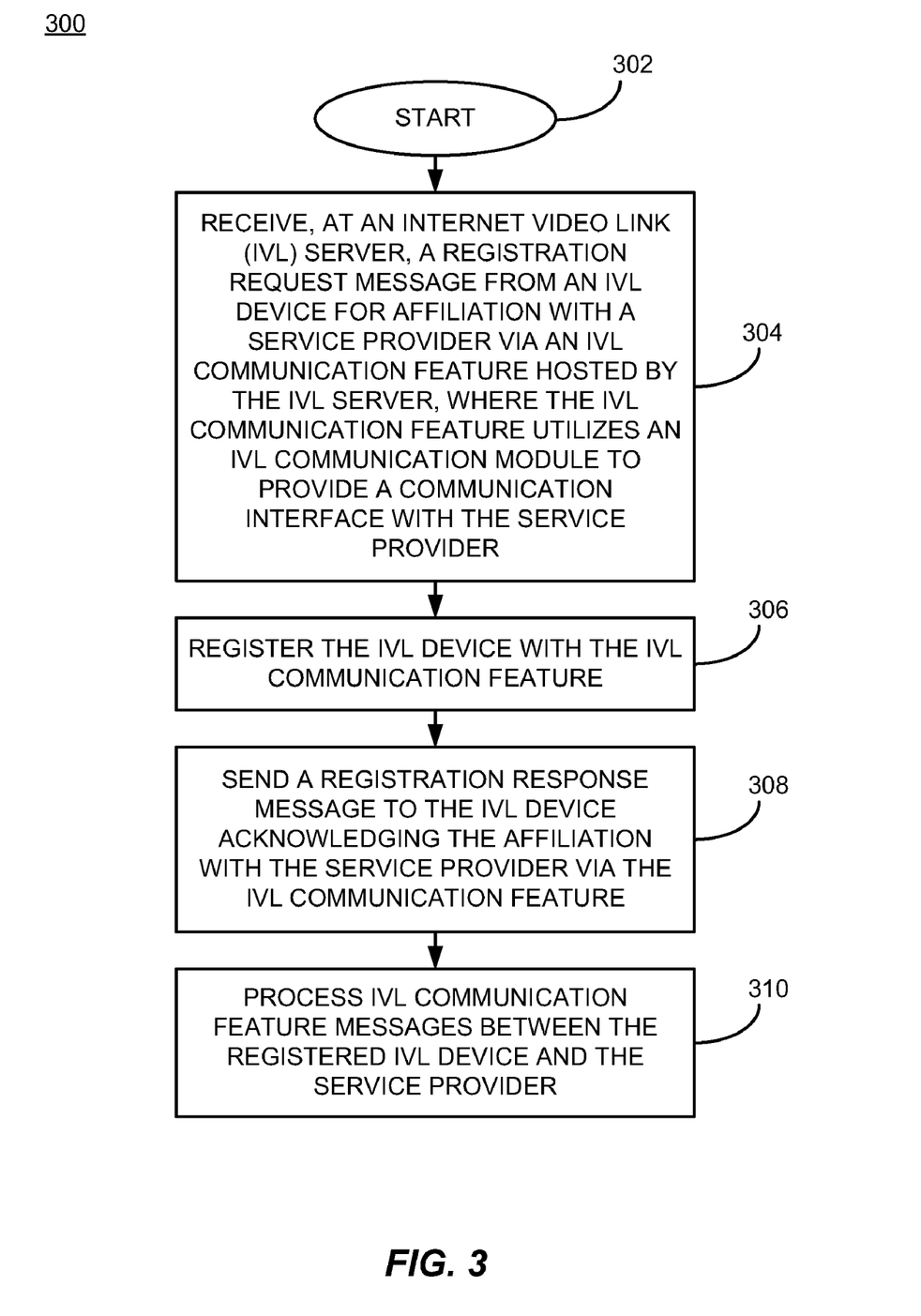
FIG. 3 is a flow chart of an example of an implementation of a process that provides automated device-service affiliation via Internet video link consistent with certain embodiments of the present invention.
Figure 4A:
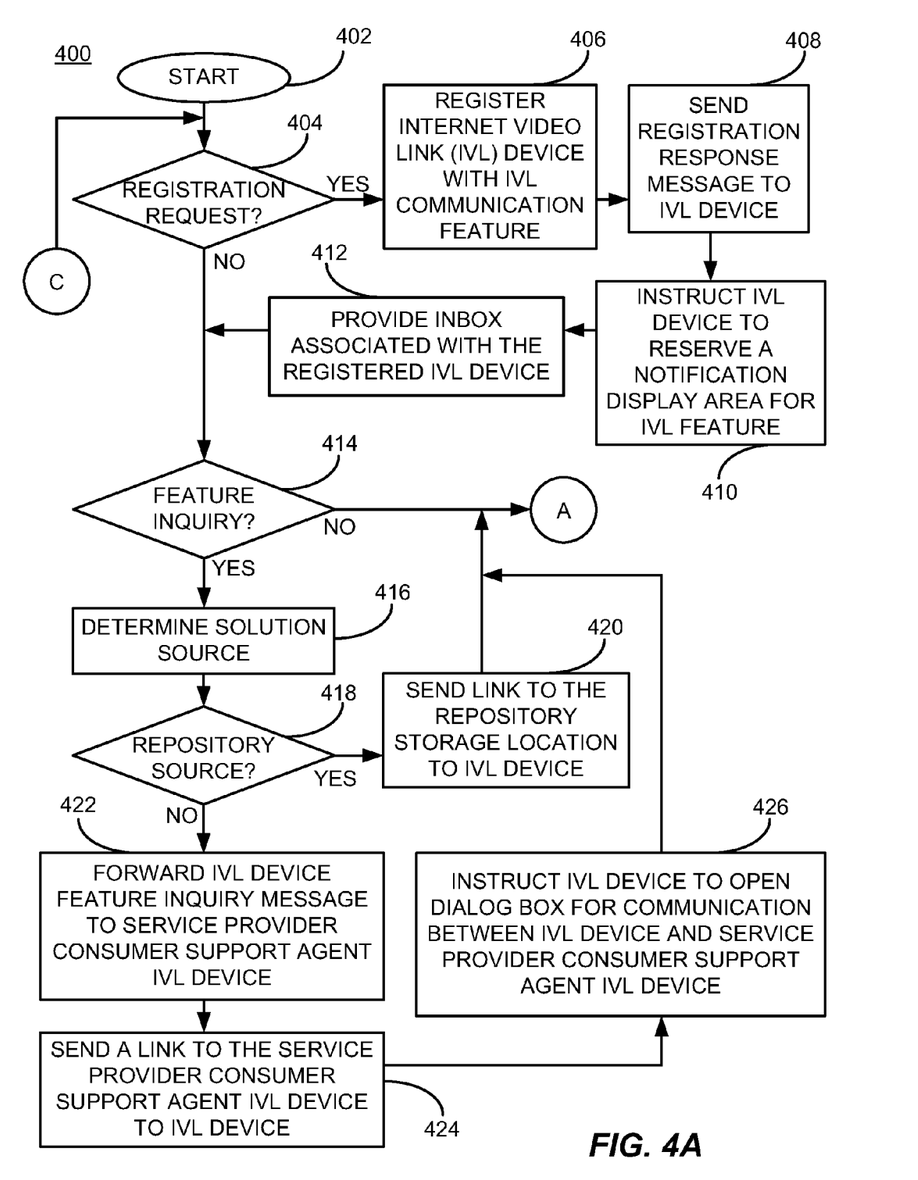
FIG. 4A is a flow chart of an example of an implementation of initial processing within a process for automated device-service affiliation via Internet video link at an Internet video link (IVL) server consistent with certain embodiments of the present invention.
Figure 4B:
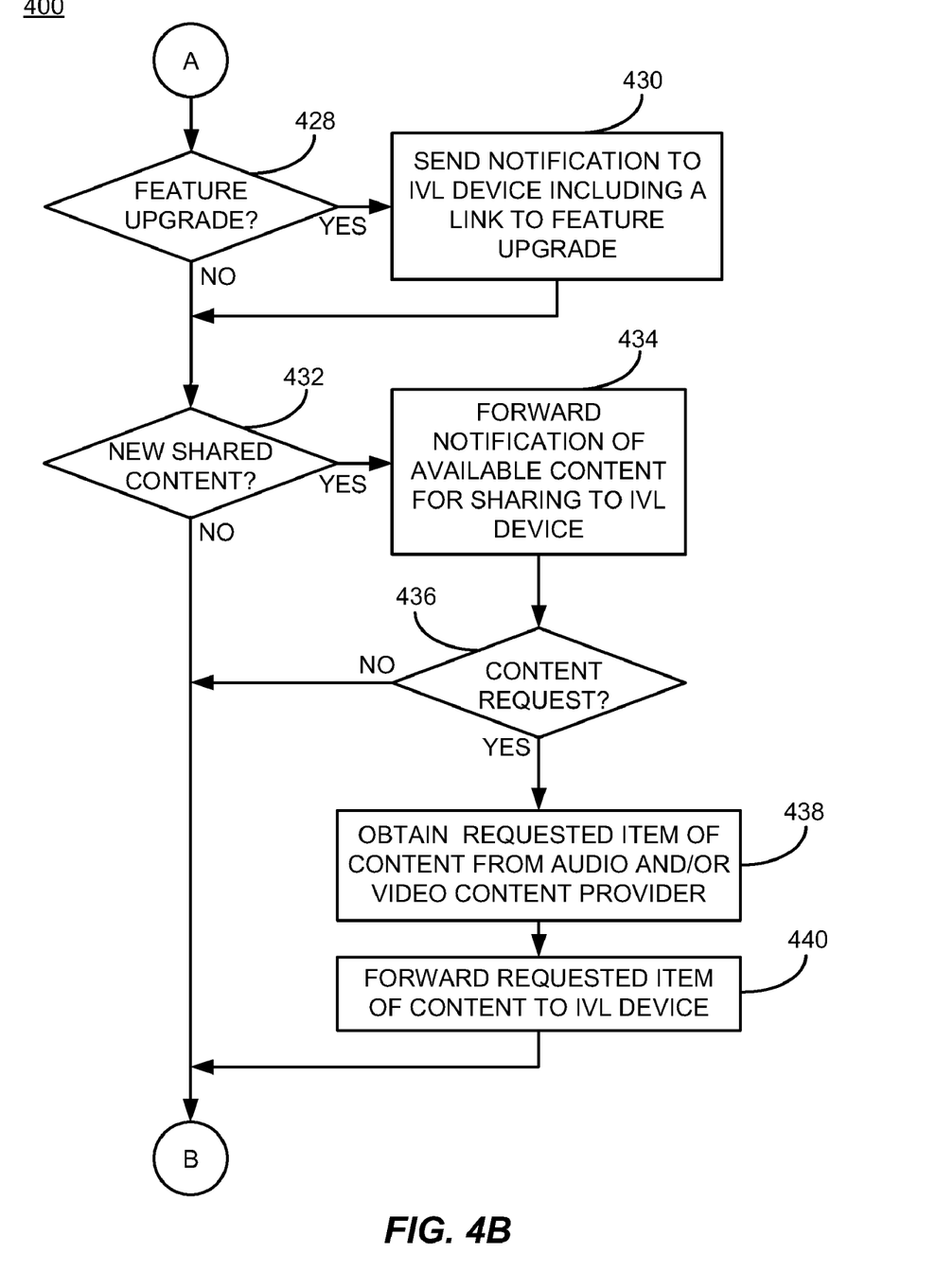
FIG. 4B is a flow chart of an example of an implementation of a first portion of additional processing within a process for automated device-service affiliation via Internet video link at an Internet video link (IVL) server consistent with certain embodiments of the present invention.
Figure 4C:
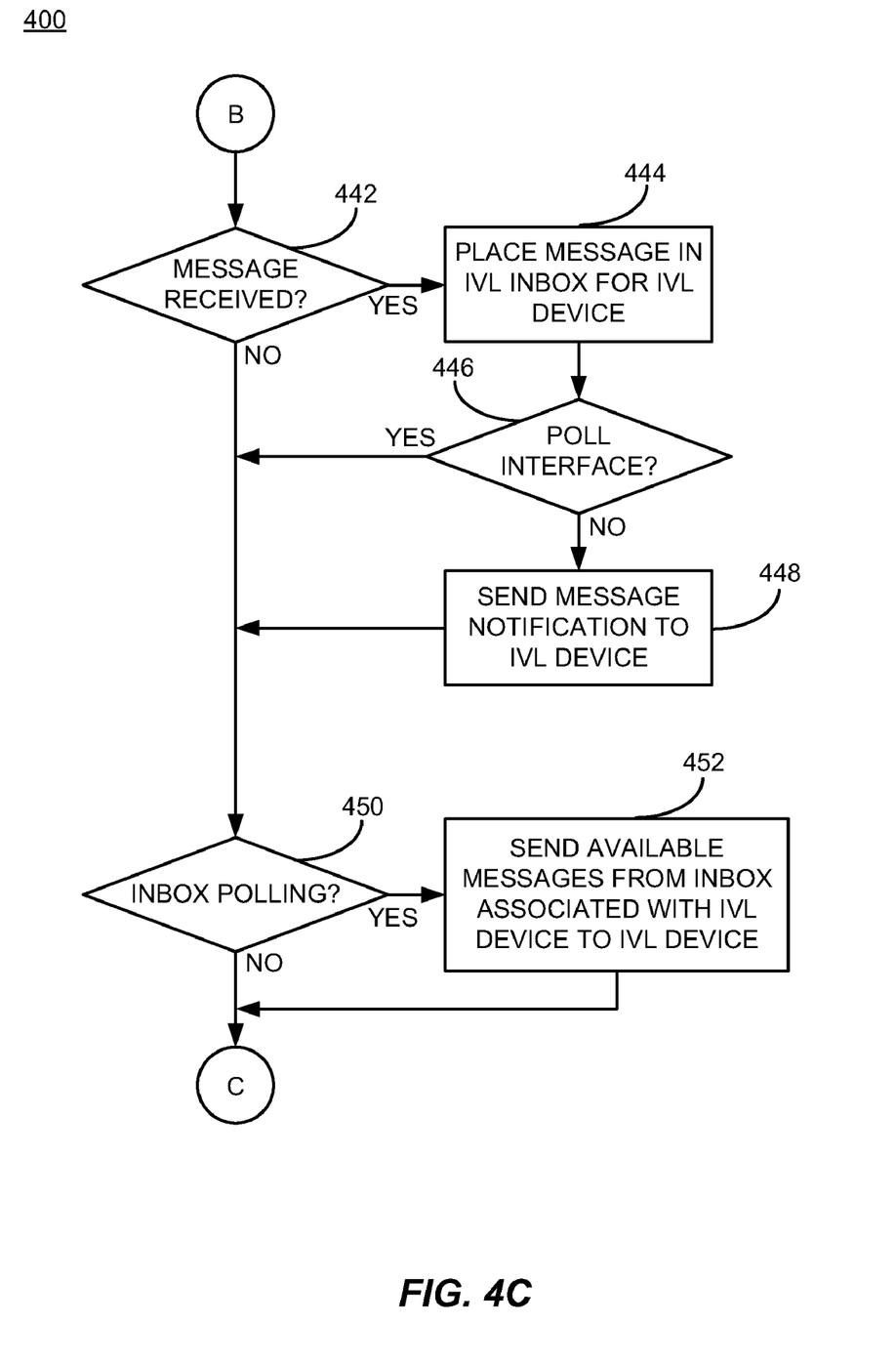
FIG. 4C is a flow chart of an example of an implementation of a second portion of additional processing within a process for automated device-service affiliation via Internet video link at an Internet video link (IVL) server consistent with certain embodiments of the present invention.

FIG. 3 through FIG. 4C below describe example processes that may be executed by such devices, such as the IVL server 106, to perform the automated device-service affiliation via Internet video link associated with the present subject matter. Many other variations on the example processes are possible and all are considered within the scope of the present subject matter. The example processes may be performed by modules, such as the affiliation processing module 222 and/or executed by the processor 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 that provides automated device-service affiliation via Internet video link. The process 300 along with the other processes described below may be executed by any device, such as the IVL server 106. The process 300 starts at 302. At block 304, the process 300 receives, at an Internet video link (IVL) server, a registration request message from an IVL device for affiliation with a service provider via an IVL communication feature hosted by the IVL server, where the IVL communication feature utilizes an IVL communication module to provide a communication interface with the service provider. At block 306, the process 300 registers the IVL device with the IVL communication feature. At block 308, the process 300 sends a registration response message to the IVL device acknowledging the affiliation with the service provider via the IVL communication feature. At block 310, the process 300 processes IVL communication feature messages between the registered IVL device and the service provider.

FIGS. 4A-4C illustrate a flow chart of an example of an implementation of process 400 for automated device-service affiliation via Internet video link at an Internet video link (IVL) server, such as the IVL server 106. As described above, complementary processing to initiate actions within or responsive to actions of the process 400 may be performed on other devices, such as the IVL device 102, the IVL device 108, the manufacturer IVL server 110, and the content provider IVL server 112. Accordingly, all such processing is considered within the scope of the present subject matter. FIG. 4A illustrates initial processing within the process 400. The process 400 starts at 402. At decision point 404, the process 400 makes a determination as to whether a registration request message has been received. A registration request message may be received from an IVL device for affiliation with a service provider via an IVL communication feature hosted by the IVL server. The IVL communication feature provides a communication interface with the service provider. A registration request may be received from any of the IVL device 102, the IVL device 108, the manufacturer IVL server 110, and the content provider IVL server 112, to request registration for device-service affiliation via Internet video link. For purposes of the present example, it is assumed that the service provider is already affiliated with the IVL server 106 through similar processing and that the registration request message was received from the IVL device 102. Additionally, the IVL communication feature may include an IVL inter-platform communication feature that bridges communications between disparate physical platforms, such as between a Sony PlayStation® brand gaming device (e.g., a PS 3®) and a TV. The process 400 may process IVL inter-platform communication feature messages during periods of activation of the IVL inter-platform communication feature at the respective IVL device.

In response to determining that a registration request has been received, the process 400 registers the IVL device 102 with an IVL communication feature associated with the registration request at block 406. As described above, multiple IVL communication features may be hosted by an IVL server. As such, a registration request may request either a single IVL communication feature affiliation or may request affiliation with all IVL communication features hosted by an IVL server. Additional aspects of processing, such as approval of authorization for affiliation with a particular IVL communication feature and account setup may be implemented as appropriate for a given implementation.

At block 408, the process 400 sends a registration response message to the IVL device 102 acknowledging affiliation with the service provider via the IVL communication feature. At block 410, the process 400 instructs the IVL device 102 to reserve a notification display area for the IVL feature. The reserved notification display area may be a fixed display area or a variable display area, and may be continuously active or may be hidden when the IVL feature is not active on the IVL device 102. Many possibilities exist for reserving a notification display area and all are considered within the scope of the present subject matter.

At block 412, the process 400 provides an inbox associated with the registered IVL device 102. The inbox may be stored within the message lists storage area 218 of the core processing module 200, as implemented in association with the IVL server 106. Returning to the description of decision point 404, in response to determining that a registration request has not been received, or upon providing an inbox associated with the registered IVL device 102 at block 412, the process 400 proceeds to decision point 414. It should be noted that a higher-level processing loop for the process 400 is distributed among FIG. 4A through FIG. 4C. Decision point 414 constitutes one of the higher-level decision points along with decision point 404 described above.

At decision point 414, the process 400 makes a determination as to whether an IVL device feature inquiry message associated with an operational feature of the IVL device 102 has been received from the IVL device 102. An IVL device feature inquiry message may be initiated via the IVL device 102 to inquire about a feature of the IVL device 102. As described above, use of the feature inquiry message by the IVL device 102 allows the user of the IVL device 102 to avoid the burden of looking through lengthy frequently asked question (FAQ) logs by permitting the user to initiate a request directly to the affiliated service provider using the IVL server 106.

In response to determining at decision point 414 that an IVL device feature inquiry message associated with an operational feature of the IVL device has been received from the IVL device 102, the process 400 determines a solution source of an answer to the IVL device feature inquiry message at block 416. For purposes of the present example, the solution source may include a repository storage location that stores information associated with the operational feature, or a service provider consumer support agent associated with the service provider, though other solution sources are possible and all are considered within the scope of the present subject matter.

At decision point 418, the process 400 makes a determination as to whether the solution source is a repository storage location that stores information associated with the operational feature or whether the solution source is a service provider consumer support agent associated with the service provider. In response to determining that the solution source is a repository storage location that stores information associated with the operational feature, the process 400 sends a link to the repository storage location to the IVL device 102 at block 420.

In response to determining at decision point 418 that the solution source is a service provider consumer support agent associated with the service provider, the process 400 forwards the IVL device feature inquiry message associated with an operational feature of the IVL device 102 to the service provider consumer support agent IVL device, such as the manufacturer IVL server 110, associated with the service provider consumer support agent at block 422. At block 424, the process 400 sends a link to the service provider consumer support agent IVL device associated with the service provider consumer support agent to the IVL device 102. At block 426, the process 400 instructs the IVL device 102 to open a dialog box at the IVL device 102 associated with the IVL communication feature for communication between the registered IVL device 102 and the service provider consumer support agent IVL device.

Returning to the description of decision point 414, in response to determining that an IVL device feature inquiry message associated with an operational feature of the IVL device has not been received from the IVL device 102, or upon sending the link to the repository storage location to the IVL device 102 at block 420, or upon instructing the IVL device 102 to open a dialog box at block 426, the process 400 transitions to the processing shown and described in association with FIG. 4B to consider other higher-level processing decision points.

FIG. 4B illustrates a first portion of additional processing associated with the process 400 for automated device-service affiliation via Internet video link at an Internet video link (IVL) server. At decision point 428, the process 400 makes a determination as to whether a feature upgrade associated with the IVL device is available from the service provider. As described above, the service provider may include a manufacturer of the IVL device 102, a content provider that provides audio and/or video content, or other affiliated service provider(s). By affiliation with the service provider as described herein, the IVL device 102 may be notified of feature upgrades for either the IVL device 102, for a service associated with providing content to the IVL device 102, or other feature upgrade as appropriate for a given implementation. In response to determining that a feature upgrade associated with the IVL device is available from the service provider, the process 400 sends a notification message to the IVL device 102 including a link to the feature upgrade at block 430.

In response to sending a notification message to the IVL device 102 including a link to the feature upgrade at block 430 or in response to determining that no feature upgrade is available at decision point 428, the process 400 makes a determination at decision point 432 as to whether a notification of available new content for sharing has been received from an audio and/or a video content provider, such as the content provider IVL server 112, or from the IVL device 108 from another affiliated IVL device user. In response to determining that a notification of available new content for sharing has been received, the process 400 forwards the notification of available content for sharing to the IVL device 102 at block 434.

At decision point 436, the process 400 makes a determination as to whether a content request for an item of the available content has been received from the IVL device 102. In response to determining that a content request for an item of the available content has been received from the IVL device 102, the process obtains the requested item of content from the audio and/or video content provider, or other affiliated IVL device user, at block 438. At block 440, the process 400 forwards the requested item of content to the IVL device 102. In response to completion of forwarding the requested item of content to the IVL device 102 at block 440, or in response to determining at decision point 436 that a content request has not been received, or in response to determining at decision point 432 that a notification of available new content for sharing has not been received, the process 400 transitions to the processing shown and described in association with FIG. 4C to consider other higher-level processing decision points.

FIG. 4C illustrates a second portion of additional processing associated with the process 400 for automated device-service affiliation via Internet video link at an Internet video link (IVL) server. At decision point 442, the process 400 makes a determination as to whether a message has been received for the registered and affiliated IVL device 102. In response to determining that a message has been received for the registered and affiliated IVL device 102, the process 400 places the received message, along with any other available IVL communication feature messages for the IVL device 102, within the IVL inbox for the IVL device 102 at block 444.

At decision point 446, the process 400 makes a determination as to whether the messaging interface to the IVL device 102 is a polled or pushed messaging interface. In response to determining that the messaging interface to the IVL device 102 is a pushed messaging interface, the process 400 sends a message notification to the IVL device 102 at block 448.

In response to sending the message notification to the IVL device 102 at block 448, or in response to determining that the messaging interface to the IVL device 102 is a polled messaging interface at decision point 446, or in response to determining that a message has not been received for the registered and affiliated IVL device 102 at decision point 442, the process 400 makes a determination at decision point 450 as to whether an inbox polling event has occurred. An inbox polling event may occur, for example, in response to the IVL device 102 logging into the IVL server 106, such as in response to a message notification or another aperiodic event initiated by a user of the IVL device 102, and polling for IVL communication feature messages.

In response to determining that an inbox polling event has occurred at decision point 450, the process 400 sends the available IVL communication feature messages within the inbox to the IVL device 102 for display via the reserved IVL device display area, described above, at block 452. In response to sending the available IVL communication feature messages within the inbox to the IVL device for display via the reserved IVL device display area at block 452, or in response to determining that an inbox polling event has not occurred at decision point 450, the process 400 returns to decision point 404 as shown and described in association with FIG. 4A and iterates among the higher-level processing decision points as described above. It is understood that the present example process 400 has been described in association with a single registered and affiliated IVL device 102 for ease of description purposes. However, it should be understood that the process 400 is directed toward processing for multiple IVL devices and multiple IVL communication features in association with multiple IVL service providers. Accordingly, all such processing is considered within the scope of the present subject matter.

Thus, in accord with certain implementations, a method of device-service affiliation via Internet video link involves receiving, at an Internet video link (IVL) server, a registration request message from an IVL device for affiliation with a service provider via an IVL communication feature hosted by the IVL server, where the IVL communication feature utilizes an IVL communication module to provide a communication interface with the service provider and the service provider includes one of a device manufacturer of the IVL device and an audio/video content provider; registering the IVL device with the IVL communication feature; sending a registration response message to the IVL device acknowledging the affiliation with the service provider via the IVL communication feature; receiving an IVL device feature inquiry message associated with an operational feature of the IVL device; determining a solution source of an answer to the IVL device feature inquiry message; in response to determining that the solution source includes a repository storage location that stores information associated with the operational feature, the method involves sending a link to the repository storage location to the IVL device; and in response to determining that the solution source includes a service provider consumer support agent associated with the service provider, the method involves forwarding the IVL device feature inquiry message associated with the operational feature of the IVL device to the service provider consumer support agent IVL device associated with the service provider consumer support agent; sending a link to the service provider consumer support agent IVL device associated with the service provider consumer support agent to the IVL device; and instructing the IVL device to open a dialog box at the IVL device associated with the IVL communication feature for communication between the registered IVL device and the service provider consumer support agent.

In certain implementations, a method of device-service affiliation via Internet video link involves receiving, at an Internet video link (IVL) server, a registration request message from an IVL device for affiliation with a service provider via an IVL communication feature hosted by the IVL server, where the IVL communication feature utilizes an IVL communication module to provide a communication interface with the service provider; registering the IVL device with the IVL communication feature; sending a registration response message to the IVL device acknowledging the affiliation with the service provider via the IVL communication feature; and processing IVL communication feature messages between the registered IVL device and the service provider.

In certain implementations, the IVL communication feature includes an IVL inter-platform communication feature and the method of device-service affiliation via Internet video link involving processing the IVL communication feature messages between the registered IVL device and the service provider involves processing IVL inter-platform communication feature messages during periods of activation of the IVL inter-platform communication feature at the IVL device.

In certain implementations, the service provider includes a device manufacturer of the IVL device and the method of processing the IVL communication feature messages between the registered IVL device and the service provider involves receiving an IVL device feature inquiry message associated with an operational feature of the IVL device; determining a solution source of an answer to the IVL device feature inquiry message; and sending a link to the solution source to the IVL device. In certain implementations, the method of determining the solution source of the answer to the IVL device feature inquiry message involves determining that the solution source includes a repository storage location that stores information associated with the operational feature; and the method of sending the link to the solution source to the IVL device involves sending a link to the repository storage location to the IVL device. In certain implementations, the method of determining the solution source of the answer to the IVL device feature inquiry message involves determining that the solution source includes a service provider consumer support agent associated with the service provider; forwarding the IVL device feature inquiry message associated with the operational feature of the IVL device to the service provider consumer support agent IVL device associated with the service provider consumer support agent; the method of sending the link to the solution source to the IVL device involves sending a link to the service provider consumer support agent IVL device associated with the service provider consumer support agent to the IVL device; and the method further involves instructing the IVL device to open a dialog box at the IVL device associated with the IVL communication feature for communication between the registered IVL device and the service provider consumer support agent. In certain implementations, the method of processing the IVL communication feature messages between the registered IVL device and the service provider involves determining that a feature upgrade associated with the IVL device is available from the service provider; and sending a notification message to the IVL device including a link to the feature upgrade. In certain implementations, the service provider includes one of an audio content provider, a video content provider, and an audio/video content provider and the method of processing the IVL communication feature messages between the registered IVL device and the service provider involves receiving a notification of available content for sharing from the one of the audio content provider, the video content provider, and the audio/video content provider; forwarding the notification of available content for sharing to the IVL device; receiving a request for an item of the available content from the IVL device; obtaining the requested item of the available content from the one of the audio content provider, the video content provider, and the audio/video content provider in response to receiving the request for the item of the available content from the IVL device; and forwarding the requested item of the available content to the IVL device. In certain implementations, the method of processing the IVL communication feature messages between the registered IVL device and the service provider involves sending available IVL communication feature messages to the IVL device in response to an IVL communication feature message polling inquiry from the IVL device. In certain implementations, the method of processing the IVL communication feature messages between the registered IVL device and the service provider involves instructing the IVL device to reserve a display area of a display associated with the IVL device for IVL communication feature notifications; providing an inbox associated with the IVL server for the registered IVL device; placing available IVL communication feature messages for the IVL device within the inbox; and sending the available IVL communication feature messages within the inbox to the IVL device for display via the reserved IVL device display area in response to the IVL device logging into the IVL server and polling for the IVL communication feature messages.

In another implementation, a computer readable storage medium may store instructions which, when executed on one or more programmed processors, carry out a method of device-service affiliation via Internet video link involving receiving, at an Internet video link (IVL) server, a registration request message from an IVL device for affiliation with a service provider via an IVL communication feature hosted by the IVL server, where the IVL communication feature utilizes an IVL communication module to provide a communication interface with the service provider; registering the IVL device with the IVL communication feature; sending a registration response message to the IVL device acknowledging the affiliation with the service provider via the IVL communication feature; and processing IVL communication feature messages between the registered IVL device and the service provider.

An Internet video link (IVL) server consistent with certain implementations has an Internet video link (IVL) communication module; and a processor programmed to receive a registration request message from an IVL device for affiliation with a service provider via an IVL communication feature hosted by the IVL server, where the IVL communication feature utilizes the IVL communication module to provide a communication interface with the service provider; register the IVL device with the IVL communication feature; send a registration response message to the IVL device acknowledging the affiliation with the service provider via the IVL communication feature; and process IVL communication feature messages between the registered IVL device and the service provider.

In certain implementations, the IVL communication feature includes an IVL inter-platform communication feature and, in being programmed to process the IVL communication feature messages between the registered IVL device and the service provider, the processor is programmed to process IVL inter-platform communication feature messages during periods of activation of the IVL inter-platform communication feature at the IVL device. In certain implementations, the service provider includes a device manufacturer of the IVL device and, in being programmed to process the IVL communication feature messages between the registered IVL device and the service provider, the processor is programmed to receive an IVL device feature inquiry message associated with an operational feature of the IVL device; determine a solution source of an answer to the IVL device feature inquiry message; and send a link to the solution source to the IVL device. In certain implementations, in being programmed to determine the solution source of the answer to the IVL device feature inquiry message, the processor is programmed to determine that the solution source includes a repository storage location that stores information associated with the operational feature; and, in being programmed to send the link to the solution source to the IVL device, the processor is programmed to send a link to the repository storage location to the IVL device. In certain implementations, in being programmed to determine the solution source of the answer to the IVL device feature inquiry message, the processor is programmed to determine that the solution source includes a service provider consumer support agent associated with the service provider; forward the IVL device feature inquiry message associated with the operational feature of the IVL device to the service provider consumer support agent IVL device associated with the service provider consumer support agent; in being programmed to send the link to the solution source to the IVL device, the processor is programmed to send a link to the service provider consumer support agent IVL device associated with the service provider consumer support agent to the IVL device; and the processor is further programmed to instruct the IVL device to open a dialog box at the IVL device associated with the IVL communication feature for communication between the registered IVL device and the service provider consumer support agent. In certain implementations, in being programmed to process the IVL communication feature messages between the registered IVL device and the service provider, the processor is programmed to determine that a feature upgrade associated with the IVL device is available from the service provider; and send a notification message to the IVL device including a link to the feature upgrade. In certain implementations, the service provider includes one of an audio content provider, a video content provider, and an audio/video content provider and, in being programmed to process the IVL communication feature messages between the registered IVL device and the service provider, the processor is programmed to receive a notification of available content for sharing from the one of the audio content provider, the video content provider, and the audio/video content provider; forward the notification of available content for sharing to the IVL device; receive a request for an item of the available content from the IVL device; obtain the requested item of the available content from the one of the audio content provider, the video content provider, and the audio/video content provider in response to receiving the request for the item of the available content from the IVL device; and forward the requested item of the available content to the IVL device. In certain implementations, in being programmed to process the IVL communication feature messages between the registered IVL device and the service provider, the processor is programmed to send available IVL communication feature messages to the IVL device in response to an IVL communication feature message polling inquiry from the IVL device. In certain implementations, in being programmed to process the IVL communication feature messages between the registered IVL device and the service provider, the processor is programmed to instruct the IVL device to reserve a display area of a display associated with the IVL device for IVL communication feature notifications; provide an inbox associated with the IVL server for the registered IVL device; place available IVL communication feature messages for the IVL device within the inbox; and send the available IVL communication feature messages within the inbox to the IVL device for display via the reserved IVL device display area in response to the IVL device logging into the IVL server and polling for the IVL communication feature messages.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of device-service affiliation via Internet video link, comprising:
receiving, at an Internet video link (IVL) server, a registration request message from an IVL device for affiliation with a service provider via an IVL communication feature hosted by the IVL server, where the IVL communication feature utilizes an IVL communication module to provide a communication interface with the service provider and the service provider comprises one of a device manufacturer of the IVL device and an audio/video content provider;
registering the IVL device with the IVL communication feature;
sending a registration response message to the IVL device acknowledging the affiliation with the service provider via the IVL communication feature;
receiving an IVL device feature inquiry message associated with an operational feature of the IVL device;
determining a solution source of an answer to the IVL device feature inquiry message;
in response to determining that the solution source comprises a repository storage location that stores information associated with the operational feature:
sending a link to the repository storage location to the IVL device; and
in response to determining that the solution source comprises a service provider consumer support agent associated with the service provider:
forwarding the IVL device feature inquiry message associated with the operational feature of the IVL device to the service provider consumer support agent IVL device associated with the service provider consumer support agent;
sending a link to the service provider consumer support agent IVL device associated with the service provider consumer support agent to the IVL device; and
instructing the IVL device to open a dialog box at the IVL device associated with the IVL communication feature for communication between the registered IVL device and the service provider consumer support agent.

2. A method of device-service affiliation via Internet video link, comprising:
- receiving, at an Internet video link (IVL) server, a registration request message from an IVL device for affiliation with a service provider via an IVL communication feature hosted by the IVL server, where the IVL communication feature utilizes an IVL communication module to provide a communication interface with the service provider;
- registering the IVL device with the IVL communication feature;
- sending a registration response message to the IVL device acknowledging the affiliation with the service provider via the IVL communication feature; and
- processing IVL communication feature messages between the registered IVL device and the service provider;
- wherein the service provider comprises a device manufacturer of the IVL device and wherein processing the IVL communication feature messages between the registered IVL device and the service provider comprises:
  - receiving an IVL device feature inquiry message associated with an operational feature of the IVL device;
  - determining a solution source of an answer to the IVL device feature inquiry message; and
  - sending a link to the solution source to the IVL device;
- wherein determining the solution source of the answer to the IVL device feature inquiry message comprises:
  - determining that the solution source comprises a service provider consumer support agent associated with the service provider; and
  - forwarding the IVL device feature inquiry message associated with the operational feature of the IVL device to the service provider consumer support agent IVL device associated with the service provider consumer support agent; wherein sending the link to the solution source to the IVL device comprises:
  - sending a link to the service provider consumer support agent IVL device associated with the service provider consumer support agent to the IVL device; and
  - further comprising instructing the IVL device to open a dialog box at the IVL device associated with the IVL communication feature for communication between the registered IVL device and the service provider consumer support agent.

3. The method according to claim 2, where the IVL communication feature comprises an IVL inter-platform communication feature and processing the IVL communication feature messages between the registered IVL device and the service provider comprises processing IVL inter-platform communication feature messages during periods of activation of the IVL inter-platform communication feature at the IVL device.

4. The method according to claim 2, where determining the solution source of the answer to the IVL device feature inquiry message comprises:
- determining that the solution source comprises a repository storage location that stores information associated with the operational feature; and
- where sending the link to the solution source to the IVL device comprises sending a link to the repository storage location to the IVL device.

5. The method according to claim 2, where processing the IVL communication feature messages between the registered IVL device and the service provider comprises:
- determining that a feature upgrade associated with the IVL device is available from the service provider; and
- sending a notification message to the IVL device comprising a link to the feature upgrade.

6. The method associated with claim 2, where the service provider comprises one of an audio content provider, a video content provider, and an audio/video content provider and processing the IVL communication feature messages between the registered IVL device and the service provider comprises:
- receiving a notification of available content for sharing from the one of the audio content provider, the video content provider, and the audio/video content provider;
- forwarding the notification of available content for sharing to the IVL device;
- receiving a request for an item of the available content from the IVL device;
- obtaining the requested item of the available content from the one of the audio content provider, the video content provider, and the audio/video content provider in response to receiving the request for the item of the available content from the IVL device; and
- forwarding the requested item of the available content to the IVL device.

7. The method according to claim 2, where processing the IVL communication feature messages between the registered IVL device and the service provider comprises:
- sending available IVL communication feature messages to the IVL device in response to an IVL communication feature message polling inquiry from the IVL device.

8. The method according to claim 2, where processing the IVL communication feature messages between the registered IVL device and the service provider comprises:
- instructing the IVL device to reserve a display area of a display associated with the IVL device for IVL communication feature notifications;
- providing an inbox associated with the IVL server for the registered IVL device;
- placing available IVL communication feature messages for the IVL device within the inbox; and
- sending the available IVL communication feature messages within the inbox to the IVL device for display via the reserved IVL device display area in response to the IVL device logging into the IVL server and polling for the IVL communication feature messages.

9. A non-transitory computer readable storage medium storing instructions which, when executed on one or more programmed processors, carry out a method according to claim 2.

10. An Internet video link (IVL) server, comprising:
- an Internet video link (IVL) communication module; and
- a processor programmed to:
  - receive a registration request message from an IVL device for affiliation with a service provider via an IVL communication feature hosted by the IVL server, where the IVL communication feature utilizes the IVL communication module to provide a communication interface with the service provider;
  - register the IVL device with the IVL communication feature;
  - send a registration response message to the IVL device acknowledging the affiliation with the service provider via the IVL communication feature; and
  - process IVL communication feature messages between the registered IVL device and the service provider;
  - wherein the service provider comprises a device manufacturer of the IVL device and in being programmed to process the IVL communication feature messages between the registered IVL device and the service provider, the processor is programmed to:
- receive an IVL device feature inquiry message associated with an operational feature of the IVL device;
- determine a solution source of an answer to the IVL device feature inquiry message; and
- send a link to the solution source to the IVL device;

where, in being programmed to determine the solution source of the answer to the IVL device feature inquiry message, the processor is programmed to:
- determine that the solution source comprises a service provider consumer support agent associated with the service provider; and
- forward the IVL device feature inquiry message associated with the operational feature of the IVL device to the service provider consumer support agent IVL device associated with the service provider consumer support agent;
- where, in being programmed to send the link to the solution source to the IVL device, the processor is programmed to send a link to the service provider consumer support agent IVL device associated with the service provider consumer support agent to the IVL device; and
- where the processor is further programmed to instruct the IVL device to open a dialog box at the IVL device associated with the IVL communication feature for communication between the registered IVL device and the service provider consumer support agent.

11. The Internet video link (IVL) server according to claim 10, where the IVL communication feature comprises an IVL inter-platform communication feature and where, in being programmed to process the IVL communication feature messages between the registered IVL device and the service provider, the processor is programmed to process IVL inter-platform communication feature messages during periods of activation of the IVL inter-platform communication feature at the IVL device.

12. The Internet video link (IVL) server according to claim 10, where, in being programmed to determine the solution source of the answer to the IVL device feature inquiry message, the processor is programmed to:
- determine that the solution source comprises a repository storage location that stores information associated with the operational feature; and
- where, in being programmed to send the link to the solution source to the IVL device, the processor is programmed to send a link to the repository storage location to the IVL device.

13. The Internet video link (IVL) server according to claim 10, where, in being programmed to process the IVL communication feature messages between the registered IVL device and the service provider, the processor is programmed to:
- determine that a feature upgrade associated with the IVL device is available from the service provider; and
- send a notification message to the IVL device comprising a link to the feature upgrade.

14. The Internet video link (IVL) server associated with claim 10, where the service provider comprises one of an audio content provider, a video content provider, and an audio/video content provider and where, in being programmed to process the IVL communication feature messages between the registered IVL device and the service provider, the processor is programmed to:
- receive a notification of available content for sharing from the one of the audio content provider, the video content provider, and the audio/video content provider;
- forward the notification of available content for sharing to the IVL device;
- receive a request for an item of the available content from the IVL device;
- obtain the requested item of the available content from the one of the audio content provider, the video content provider, and the audio/video content provider in response to receiving the request for the item of the available content from the IVL device; and
- forward the requested item of the available content to the IVL device.

15. The Internet video link (IVL) server according to claim 10, where, in being programmed to process the IVL communication feature messages between the registered IVL device and the service provider, the processor is programmed to:
- send available IVL communication feature messages to the IVL device in response to an IVL communication feature message polling inquiry from the IVL device.

16. The Internet video link (IVL) server according to claim 10, where, in being programmed to process the IVL communication feature messages between the registered IVL device and the service provider, the processor is programmed to:
- instruct the IVL device to reserve a display area of a display associated with the IVL device for IVL communication feature notifications;
- provide an inbox associated with the IVL server for the registered IVL device;
- place available IVL communication feature messages for the IVL device within the inbox; and
- send the available IVL communication feature messages within the inbox to the IVL device for display via the reserved IVL device display area in response to the IVL device logging into the IVL server and polling for the IVL communication feature messages.

* * * * *